United States Patent [19]

Jones

[11] 4,304,471
[45] Dec. 8, 1981

[54] MEANS FOR PRODUCING ARTISTIC BORDERS ON PHOTOGRAPHIC PRINTS, WITH OR WITHOUT APPROPRIATE WORDING

[76] Inventor: Mary R. Jones, 224 Town Line Rd., Wayland, N.Y. 14572

[21] Appl. No.: 32,158

[22] Filed: Apr. 23, 1979

[51] Int. Cl.³ .................... G03B 17/24; G03B 11/00
[52] U.S. Cl. ...................................... 354/108; 354/296
[58] Field of Search ................... 354/107, 108, 296; 355/125, 126

[56] References Cited

U.S. PATENT DOCUMENTS

| | | | |
|---|---|---|---|
| 1,170,522 | 2/1916 | Feltenstein | 354/108 |
| 1,362,581 | 12/1920 | Schmidt | 354/108 |
| 2,760,418 | 8/1956 | Hawn | 354/108 X |
| 3,547,015 | 12/1970 | Dalton | 354/107 |
| 3,916,423 | 10/1975 | Ueda et al. | 354/108 |
| 4,107,716 | 8/1978 | Pfefer | 354/296 |

FOREIGN PATENT DOCUMENTS 209806  1/1924  United Kingdom ................ 354/296

*Primary Examiner*—L. T. Hix
*Assistant Examiner*—Thomas H. Tarcza
*Attorney, Agent, or Firm*—Stonebraker, Shepard & Stephens

[57] ABSTRACT

A photographic camera with guide channels built into the camera in a plane parallel to and just a short distance in front of the focal plane in which the film is located during the exposure. Through a slot in the side wall of the camera, with light sealing means at this slot, a removable and interchangeable mask is placed in the camera and pushed in to a position properly aligned with the picture area of the focal plane. The mask has at least one light transmitting portion through which light from the camera lens may reach the film to make an image thereon when an exposure is made, and one or more opaque portions surrounding a slight transmitting portion of the mask. The opaque portions are shaped to provide a border of non-rectangular shape having an outline or silhouette having symbolism or meaning or conveying some thought appropriate to the circumstances of the picture to be taken with the use of the mask. The silhouette or shape of the inner edge of the border may thus be in the form of the outline of an evergreen tree if the picture is to be of a Christmas party or scene, or the outline of a bell if the picture is to be of a wedding party, or the outline of a heart if the picture is to be of a loved one, and so on. Words, greetings, messages, or identifying information or dates may also appear on the mask, so that they will appear on the finished print or picture. Various specific constructions of the mask are disclosed.

1 Claim, 10 Drawing Figures

MEANS FOR PRODUCING ARTISTIC BORDERS ON PHOTOGRAPHIC PRINTS, WITH OR WITHOUT APPROPRIATE WORDING

This invention relates to simple and effective means for producing artistic borders of various desired configurations or shapes, on photographic prints or the negatives of prints, at the time that the prints or the negatives are originally exposed, as distinguished from borders produced by later processing in a dark room after the exposure has been made and when a print is to be produced from a previously exposed negative. The invention also relates to production, if desired, of appropriate wording, or a legend or marking of appropriate kind, again produced or resulting from the original exposure rather than being added later such as when making a print in a dark room from a previously exposed negative.

Mats or masks for use in making prints from a previously exposed negative are well known in the art. The present invention does not relate to these, and is to be carefully distinguished from these. On the contrary, the present invention provides means whereby the desired artistic border of any desired configuration or shape can be produced in the print at the time of making the exposure, with or without any desired or appropriate wording, and so this invention is applicable especially to the making of pictures of the so-called "instant" kind, where the user obtains a finished print a few seconds or a very few minutes after making the exposure, without having to first expose a negative and then go to a dark room or a processing machine and make a positive print from the negative.

Certain aspects of the invention are applicable to production of artistic borders, with or without wording, upon negatives, when the original exposure of the negative is made, so that the same border effect and same wording will appear on a positive print made later from the negative. This is within the scope of the invention, but it is believed that the greater advantage and appeal of the invention lies in its applicability to "instant" photography.

For example, the present invention will enable a person having an instant camera slightly modified in accordance with the present invention, to photograph a scene such as a bride and groom who have just been married, and almost immediately hand them a picture of themselves in an appropriate artistic border such as, for example, a heart-shaped border, or other shape appropriate to the occasion. A Christmas party can be photographed with a border representing the outline or silhouette of a Christmas tree, and if desired the lower edge or upper edge of the picture may also carry appropriate words such as "Merry Christmas," with or without a date. A picture like this, handed to participants in a party just a few seconds after the picture is taken, astonishes the recipients and creates a very favorable impression.

Another possibility, for example, is to take a picture of a lonely elderly relative, such as a grandmother, with a border indicating affection, such as a heart-shaped border, and with appropriate words such as "I love you" appearing in the margin. Such a picture is greatly treasured by the recipient and makes an old person feel not quite so alone in the world.

Such results according to the invention may be accomplished in two ways. According to one form of the invention, the body of the photographic camera is modified to provide, along one edge, a thin slot through which a mask member may be inserted to lie in the exposure chamber of the camera, parallel to the photographic film and just in front of the photographic film. The mask member preferably is of such size that when it is fully inserted into its normal operative position in the camera, one edge still projects outside the camera sufficiently far to form a handle which may be easily grasped to pull the mask member out between successive exposures in order to insert a different mask member if desired. The same mask member may remain in the camera during several successive exposures, if it is not desired to change the configuration of the border. It does not interfere with the forward feeding of the film. The portion of the mask member within the exposure chamber of the camera has a central aperature through which light may reach the film just behind the mask member, and the edges of this aperture are shaped as desired, to form the periphery or outline of a heart, a bell, a Christmas tree, a diamond, or any other desired shape, and also a margin is perforated to admit light to form any desired pattern of wording or slogan, such as the above mentioned "I love you" or "Get well" or whatever may be desired. The slot in the camera body through which the mask is inserted and removed, has appropriate means to seal it against entrance of stray light, such as long pile fabric on the edges of the slot, which will come tightly together to prevent entrance of light.

According to another embodiment of the invention, the camera is not provided with a slot for entrance and removal of the special mask while film is in the camera, but instead, the interior of the camera body is formed with a shoulder just ahead of the film plane, and the mask is made of a size to fit entirely within the exposure chamber of the camera, resting against this shoulder, with no handle portion projecting outside. With this construction, the mask is first loaded into the camera before the film is inserted, and the same mask normally would stay within the camera until the entire supply of film loaded in the camera is used up. However, if it does become desirable to change the mask in order to provide a different outline or different wording, before the entire film supply is used up, then the camera back can be opened, at the expense of losing a few frames or picture areas of the film, and the mask can be taken out and a different mask can be put in the camera, and the camera back can then be closed again to use up the remaining supply of film or as much thereof as desired, for taking pictures with the new mask which has been placed in the camera.

The invention may be used in connection with cameras of any type, including television cameras, kinetoscopes, motion picture cameras, and microfilm cameras. However, its greatest usefulness and greatest appeal and advantages are in connection with cameras of the "instant" type, and the disclosure of an exemplary embodiment of the invention will be in connection with an instant camera.

DESCRIPTION OF THE PREFERRED EMBODIMENT

Figure 1:
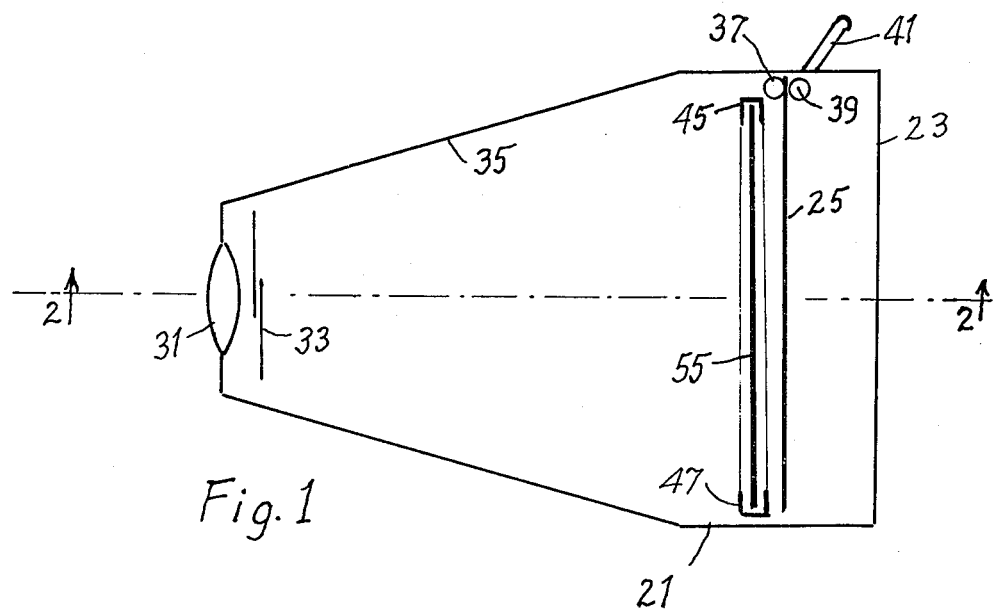
FIG. 1 is a schematic vertical section taken centrally along the optical axis of a camera according to a preferred embodiment of the invention, the section being approximately on the line 1—1 of FIG. 2.
Figure 2:
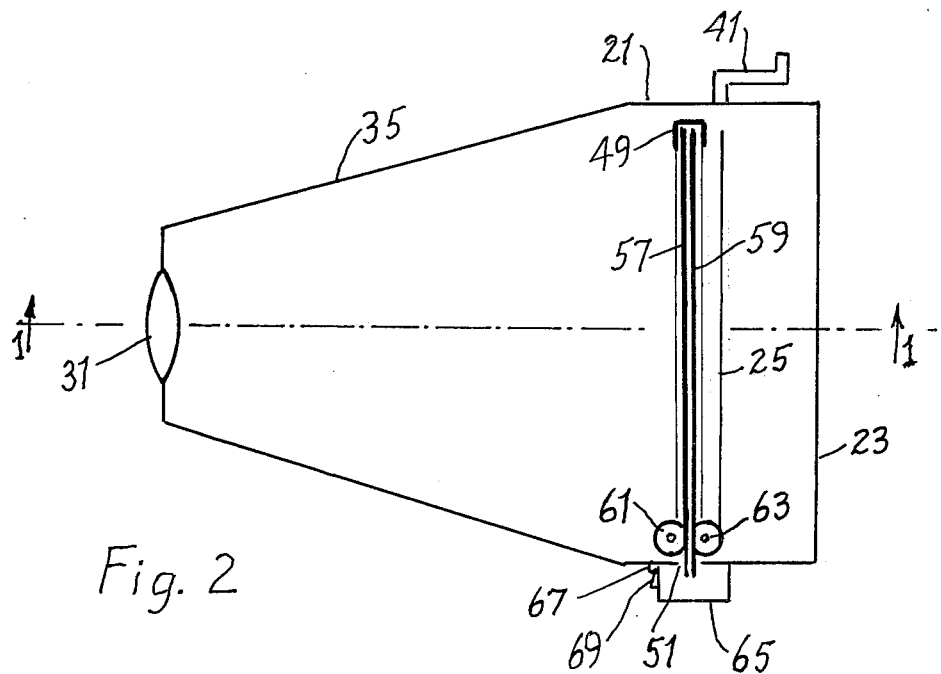
FIG. 2 is a schematic horizontal section taken along the optical axis of the camera, approximately on the line 2—2 of FIG. 1.

Referring now to FIGS. 1 and 2, which show schematically a typical camera of the kind with which the present invention is particularly useful, the camera has a main body portion 21 having a removable back 23 which may be opened to insert a supply of film in the usual conventional way. Within the camera body there is the customary means for holding and guiding film in the focal plane, film in this location being indicated at 25. At the front end of the camera is a lens 31 and shutter 33, at the forward end of the front structure 35 of the camera, which front structure may be either rigid or extensible as by folding or by a bellows construction. When the shutter is opened, light falls on the film 25. In a typical camera of the instant type, the exposed area or "frame" of film is then removed from the camera, usually at the top edge of the camera, coming out between two rollers 37 and 39 driven either by an electric motor, in some models of instant camera, or by a hand crank 41, in other models of instant camera. A processing material is automatically applied to the emulsion surface of the film (which may be of paper or equivalent) usually by the pressure action of passing between the rollers 37 and 39, and within a few minutes or a few seconds the completed picture is visible.

The parts thus far described are conventional and well known, and such cameras are manufactured and sold in great quantities by at least two well known camera manufacturers, so that further details of the conventional construction are not necessary, and the drawing is intended to illustrate such cameras only schematically.

According to the present invention, a camera of this conventional kind is modified by providing guide channel means for lateral insertion and removal of a selected mask in a position immediately in front of the film 25 in the exposure position in the focal plane, together with suitable light sealing means to permit the insertion and removal of this mask through a suitable slot in the side wall of the camera, without danger of leakage of stray light into the camera to fog the film. The direction of movement of the mask into and out of the camera is preferably at right angles to the direction of movement of the film in the camera. If the film is fed vertically, coming out from between the rollers 37 and 39 at the top edge of the camera body, then the mask guide way preferably extends horizontally from an entrance slot in one side wall of the camera, conveniently but not necessarily the left hand side wall.

The guiding means for the masks is preferably in the form of U-shaped rails or channel members 45 and 47 extending horizontally just above the top and below the bottom, respectively, of the picture area, and located in a plane a very slight distance in front of the film 25 when it is in exposure position. A third section of similar channel 49 connects the top and bottom channels 45 and 47 with each other, at the ends thereof remote from the entrance slot 51 in the side wall of the camera body. These channel members 45 and 47 form guides for the top and bottom edges, respectively, of a mask as it is shoved into the camera through the entrance slot 51, and the channel 49 serves as an abutment or stop to limit the entering motion of the masks. These channel members are firmly fixed to the surrounding wall structure of the camera body, and may be integrally moulded as part of the camera body, if the camera body is of moulded plastic material or a die cast moulding of metal.

These channels do not in any way interfere with the normal regular use of the camera in the normal conventional way, whenever it is desired to use the camera without employing the masks of the present invention. The mask-receiving channels lie outside of the picture area; that is to say, outside of the perimeter of the maximum cone of rays passing from the lens to the picture area of the film. The width of the space within the channels, front to back (that is, in the direction of the optical axis) is sufficient to accommodate the thickest mask or combination of masks which it is desired to use, with enough play so that the masks may be inserted and withdrawn without noticeable friction or difficulty. As will be apparent later from the detailed description of the masks, it is sometimes desired to use only a single mask of a single thickness, and such a mask is shown schematically at 55 in FIG. 1. At other times, it may be desired to use two masks, one having an outline or periphery to produce a border of a particular shape on the picture which is being taken, and the other having a transparent portion on which words or symbols may be marked, and these two masks may be inserted side by side as separate pieces, or may be combined together in a single laminated structure. Merely as an example, two layers of masks are schematically illustrated at 57 and 59 in FIG. 2.

The light seal or light trap associated with the slot 51, to prevent entrance of stray light, may take various forms. For example, there may be strips of long pile fabric of dark color, on opposite sides of the slot, the dense pile from the two sides of the slot meeting each other tightly to exclude light, and being thrust temporarily aside by entrance or withdrawal of a mask. Preferably, however, the light seal is formed at least in part by two rollers 61 and 63 of soft compressible material such as sponge rubber or a synthetic equivalent, one roller being mounted at each side of the slot as illustrated in FIG. 2. Normally the two rollers press against each other, with slight compression, sufficient to exclude light. The compressibility of the roller material is sufficiently great so that either a single mask or two masks together, side by side, may be pushed through the slot 51 and between the rollers 61 and 63 which will compress sufficiently to allow the masks to pass through, and yet maintain a tight light seal. As the mask or masks are advanced between the rollers, the advancing ends enter the channels 45 and 47 at the top and bottom edges of the masks, and are guided thereby until they reach their home or stop position up against the bottom of the channel 49.

The masks may be of two lengths. In this connection, it is pointed out that the word "length" is here used with reference to the dimension of the mask in the direction in which it is moved into and out of the camera, regardless of whether this is the longer dimension of the mask or whether this dimension is shorter than the height of the mask from top to bottom, in the direction of movement of the film 25 in the camera. The actual dimensions of the mask will depend, of course, on the dimensions of the picture area of the camera, and the word length is used to refer to the dimension in the direction of movement of the mask into and out of the camera, merely for convenience of description.

As stated, the masks may be of two lengths. In the shorter length, the mask may be designated so that when the inner end is tight against the abutment channel 49, the outer end of the mask will project just a slight distance outside of the light seal rollers 61, 63, just enough so that this outer edge can be barely grasped by the fingers in order to pull the mask out of the camera and replace it with a different mask. When masks of this length are used, an auxiliary light seal may be employed as an extra precaution, this auxiliary seal being in the form of a flap or door 65, having one edge hinged to the camera body at 67 (preferably by a piano type hinge) and being biased by a spring, one end of which is shown at 69, which tends to swing the door 65 to a closed position. This door or flap may be of hollowed out or slightly U-shaped cross section, with edge flanges tightly seated against the body of the camera and with a central part hollowed to receive the slightly protruding end of the mask which is in the camera, the mask being of the short kind above referred to. To remove the mask and replace it with another, the door is swung on its hinge to obtain access to the edge of the mask, to pull it out.

The longer style or kind of mask is one which extends considerably farther out from the side of the camera, and has a handle portion for easy grasping when pulling it out or putting it in the camera. With such a mask of the longer kind, it projects out so far that a door to cover the projecting end of the mask would have to be rather large and cumbersome. Hence when masks of the longer kind are to be used with the camera, the light sealing rollers 61 and 63 may be relied upon entirely, and the door 65 may be omitted. On the other hand, if the camera is supplied with such a door, the door may simply swing to a partially closed position lying against the side of the projecting part of the mask, when a mask is in place of the camera, and of course the door will close completely when no mask is in place in the camera.

Figure 3:
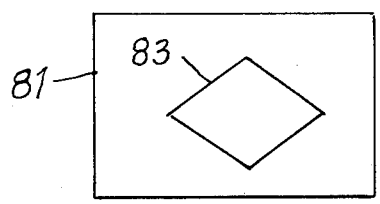
FIGS. 3-9 are face views of various forms of masks for use in the camera illustrated in FIGS. 1 and 2.

Turning now to description of the masks, much has already been said about the purpose and use of the masks, at the beginning of this specification. Referring now to FIG. 3, a simple form of mask is illustrated at 81. This is a piece of stiff opaque material with a cut out or opening 83 of any desired shape or silhouette, here shown as a diamond shape. The dimension of the mask 81 (and, in fact, of all the masks) from top to bottom is, of course, the correct size to fit between the upper and lower guiding channels 45 and 47 in the camera. As for length, the mask 81 in FIG. 3 is intended to illustrate one of the shorter masks above mentioned, which projects only a very slight distance beyond the side wall of the camera, as distinguished from other masks illustrated in other views, which are longer and which have handle portions. This mask 81 with the diamond shaped opening 83 would produce a black diamond shaped border on the picture taken in the camera while the mask was in place, the picture itself being seen within the diamond shaped area, and would be appropriate, for example, in taking a picture of a couple who were celebrating their diamond wedding anniversary, or a picture of any occasion or circumstance where the thought or impression of a diamond might be appropriate.

Figure 4:
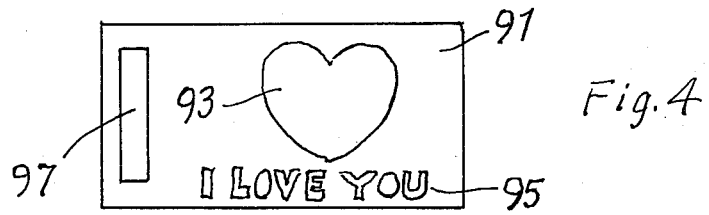

In FIG. 4, there is shown a mask 91 of opaque material with a cut out or opening 93 of heart shape. This mask also is of stiff opaque material, and it illustrates the further point that with a mask of such material, words can be cut in stencil fashion through the material, so that light would pass through the cut out words and would appear in the final picture on the otherwise black border. As an example, the words here shown are "I love you," as seen at 95. This mask is particularly suitable for photographing a loved one, or a depressed person, as both the heart shaped outline and the loving slogan are appropriate, and tend to give great pleasure to the recipient because they are totally unexpected. The person whose photograph is taken usually has no idea that such an unusual picture is coming out of the camera.

This mask shown in FIG. 4 also illustrates a mask of the long style as distinguished from the short style. By comparing FIG. 4 with FIG. 3, it will be seen that the mask is considerably longer, and will protrude from the side of the camera sufficiently far to have a handle portion with a cut out 97 through which the fingers may be put, to get a good grip on the mask to pull it out from or push in to the camera.

Both of these masks are examples of single thicknesses of stiff opaque material. With such masks, words can be used only if they are cut through the thickness of the mask, similar to making a stencil. It is preferrred in many cases to use a transparent sheet on which words may be written with a suitable writing instrument, such as a felt tip pen or other implement having ink of a character that will stick to the particular transparent sheet which is used. Such transparent sheets may be used alone, or as a separate sheet placed in the same guideway with a mask, or as part of a composite or laminated mask made up of a transparent sheet plus an opaque part with a silhouette or cut-out in the opaque part. Examples of all three of these will now be given.

Figure 5:
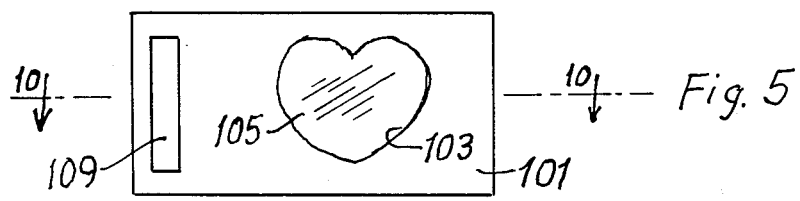
Figure 10:
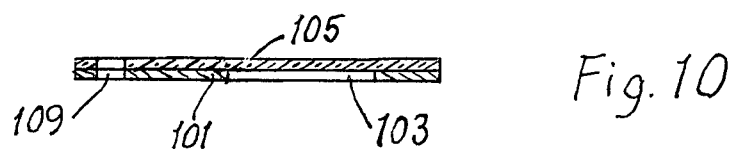
FIG. 10 is a section taken on the line 10—10 of FIG. 5.

FIGS. 5 and 10 illustrate a mask of the compo-site or laminated kind, made up of a first layer 101 of opaque material having a cut-out 103 of any desired shape (in this example, of heart shape) and a transparent layer 105 laminated to the opaque layer. Because of the two layers laminated to each other, giving added stiffness, it is not necessary for either layer to be as stiff or thick as would be required if they were used separately. This laminated construction, in this example, is extended to form a long mask, to provide a convenient grasping handle with a cut-out or opening 109 through which the fingers may be placed. Any desired message may be written on that portion of the transparent layer 105 which shows through the cut-out 103. When this mask is used, the resulting picture will appear within a heart shaped border, and whatever message is written will appear superimposed on the picture.

Figure 6:
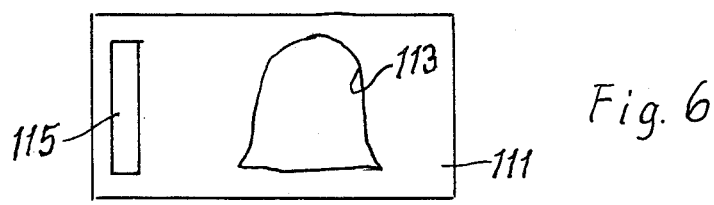

Merely to show another possible mask outline or silhouette, among the infinite variety that might be used, FIG. 6 illustrates a mask 111 with a cut-out 113 in the form of a bell. This is very appropriate for use in taking pictures of members of a wedding party, or a party at any other joyous occasion when thoughts of a bell would be appropriate. This is again an example of a long mask having a handle portion with a finger opening 115.

Figure 7:
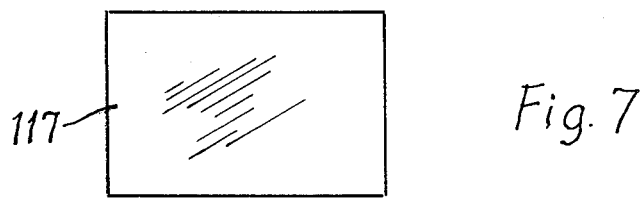

FIG. 7 illustrates a simple transparent sheet 117 of the proper mask size, on which any desired message may be written with any implement provided with ink of a character that will stick to the particular transparent sheet used. Preferably the sheet is plexiglass or similar plastic material of a kind which will take certain kinds of ink and from which the ink can be readily washed off. Such a sheet may be put in the guide channel along with an opaque mask like the mask 81 in FIG. 3 or the mask 91 in FIG. 4, and any desired symbol or wording may be marked on the portion of the transparent mask which will show through the cut-out of the opaque mask. Obviously the transparent mask may be either of the short kind, which is illustrated in FIG. 7, or of the longer kind, having a handle portion like the masks shown in FIGS. 4, 5 and 6.

Figure 8:
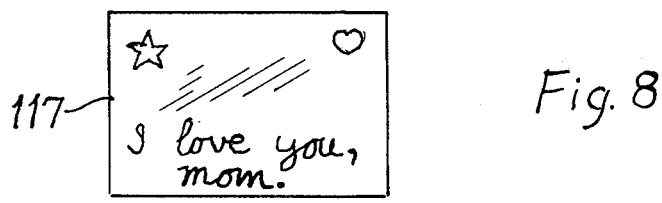

FIG. 8 illustrates the mask of FIG. 7 when used by itself to provide a message and symbols. As an example, the transparent mask has been marked with the message "I love you mom." Also the symbols of a heart and a star have been placed on it. Suppose a child makes such a mask and takes a picture of the child's mother, think of the thrill that the parent would get when handed this picture with the totally unexpected message of affection in this novel form.

Figure 9:
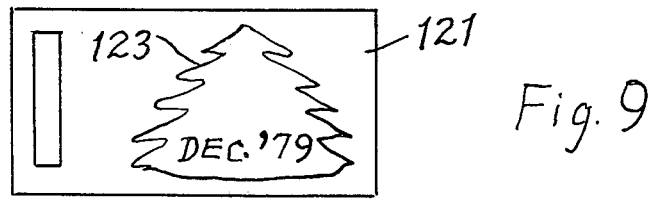

Finally, merely as another example of a possible silhouette or shape, FIG. 9 shows a mask 121 in which the cut-out or silhouette 123 is in the outline of an evergreen tree or Christmas tree. This mask is of the composite kind, an opaque sheet with the cut-out, and behind it a transparent sheet on which is placed a date. This is appropriate for use, for example, in taking a picture of a children's Christmas party, and contains a permanent record of the date.

Plain transparent masks, as in FIG. 7, may appropriately be used for recording any desired data in connection with a picture taken through such masks. For example, identification photos may be taken, first writing the name, date of birth, social security number, or other desired information about the person on the transparent mask member 117, before placing it in the camera. Then this information will show on the ensuing photograph. A transparent plate can then be wiped clean and used over again. If desired, certain standard data can be placed in permanent ink on the transparent mask sheet, leaving the variable data to be written on the sheet in washable ink, washed off and replaced after each photo is taken.

A camera equipped with this invention is also a useful tool to investigators, photographers of accidents, and the like, because a brief note of the location and/or date can be placed on a transparent plate or mask before inserting it in the camera, so that the ensuing picture will contain an unmistakable permanent record of whatever information was placed on the mask. Yet the camera equipped with this invention has not been spoiled in any way for ordinary use in the normal way when one does not desire to use the masks of the present invention. The invention is simple and inexpensive. It requires very little change in the construction of the camera. The masks themselves are easily made, and in fact can be produced by a stamping out or die-cutting process at very modest expense. It is contemplated that photographic supply houses and similar stores might carry an assortment of masks with a wide variety of different silhouettes or designs, sold at very modest expense, so that users of instant cameras equipped with the necessary channels for receiving the masks could easily purchase masks with designs or silhouettes appropriate to some party or event which they are about to attend. The unexpected novelty of the resulting photographs taken at the party or event would add greatly to the enjoyment of the occasion. A skilful person can cut his own mask from any sheet of sufficiently stiff opaque material, to produce a border configuration which symbolizes the theme or thought to be expressed in the picture to be taken with the use of the mask.

It is found in practice that the rigid or semi-rigid foamed plastic material often used in making picnic plates or for making trays for holding food products in food stores, and having a thickness of about a sixteenth or an eighth of an inch, is satisfactory for making homemade masks. Such material can be esily cut with a sharp knife. Lettering of stencil style can be cut through the thickness of such material, using either a sharp knife or a hot instrument such as the small tip end of a hot electric soldering iron. A photographer can derive much fun from making homemade masks from this or other material, to see what ingenious or original designs or silhouettes he can devise, thus providing much pleasure for himself in making the masks and pleasure for the recipient of the ensuing photograph on account of the unusual and often completely unexpected effect of seeing the photograph of himself or herself with the unusual border or margin in place of the conventional rectangular border, and with whatever words of greeting or information may have been incorporated on the mask to show on the finished print.

It is well understood in the photographic field that the image produced on the focal plane of the camera is reversed top to bottom and side to side, unless the camera is of a special design to eliminate such reversal. Therefore, allowance for the reversal must be made when producing the mask and when inserting it in the camera. In other words, some feature or shape that is intended to appear at the upper right corner of the final picture or print should be at the lower left corner of the exposure area when the mask is properly placed in the camera, and so on.

What is claimed is:

1. The method of producing an "instant" photographic picture with an artistic border having a non-rectangular silhouette intended to symbolize some circumstance of the scene being photographed, which comprises the steps of providing a camera of the "instant" developing type with means for holding a mask in a position slightly in front of and substantially parallel to a focal plane in which film is maintained while being exposed, providing a piece of cuttable opaque material of size to form one individual mask to fit said holding means in said camera, cutting said opaque material to form therein an approximately central exposure opening having a non-rectangular outline forming a silhouette of an object such as a bell, a diamond, a heart, or the outline of a tree, which symbolizes some circumstance of the scene to be photographed, placing said opaque material thus cut in the mask holding means of the camera, making an exposure of film in the camera through the mask in the camera, and developing one film to produce an "instant" positive picture print having a marginal border of a shape determined by the shape of the opening formed in the opaque material of the mask, the method further including the steps of producing a message on said mask by cutting stencil-like characters through the opaque material of the mask, in such position that the characters will show in the final print after exposure and development of the picture film, wherein the cutting of said opaque material is accomplished by applying a hot tool to the material and moving the tool along a line where a cut is to be made.

* * * * *